United States Patent

Book et al.

(10) Patent No.: US 10,320,835 B1
(45) Date of Patent: *Jun. 11, 2019

(54) DETECTING MALWARE ON MOBILE DEVICES

(71) Applicant: Pulse Secure, LLC, San Jose, CA (US)

(72) Inventors: Neil Book, Columbus, OH (US); Daniel V. Hoffman, Shorewood, IL (US)

(73) Assignee: Pulse Secure, LLC, San Jose, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/435,572

(22) Filed: Feb. 17, 2017

Related U.S. Application Data

(63) Continuation of application No. 14/949,705, filed on Nov. 23, 2015, now Pat. No. 9,576,130, which is a continuation of application No. 13/164,627, filed on Jun. 20, 2011, now Pat. No. 9,202,049.

(60) Provisional application No. 61/357,054, filed on Jun. 21, 2010.

(51) Int. Cl.
H01L 29/06 (2006.01)
H04L 29/06 (2006.01)
G06F 21/56 (2013.01)

(52) U.S. Cl.
CPC .......... *H04L 63/145* (2013.01); *G06F 21/562* (2013.01); *H04L 63/1416* (2013.01); *H04L 63/20* (2013.01); *G06F 2221/033* (2013.01)

(58) Field of Classification Search
None
See application file for complete search history.

(56) References Cited

U.S. PATENT DOCUMENTS

| | | |
|---|---|---|
| 5,452,442 A | 9/1995 | Kephart |
| 5,675,711 A | 10/1997 | Kephart et al. |
| 6,357,008 B1 | 3/2002 | Nachenberg |
| 6,553,378 B1 | 4/2003 | Eschelbeck |
| 6,577,920 B1 | 6/2003 | Hypponen et al. |
| 6,785,818 B1 | 8/2004 | Sobel et al. |
| 6,934,857 B1 | 8/2005 | Bartleson et al. |
| 6,970,697 B2 | 11/2005 | Kouznetsov et al. |
| 6,971,019 B1 | 11/2005 | Nachenberg et al. |
| 6,973,305 B2 | 12/2005 | McLean |
| 6,987,963 B2 | 1/2006 | Kouznetsov et al. |
| 6,993,660 B1 | 1/2006 | Libenzi et al. |

(Continued)

FOREIGN PATENT DOCUMENTS

| | | |
|---|---|---|
| WO | 9512162 A1 | 5/1995 |
| WO | 2007007326 A2 | 1/2007 |

OTHER PUBLICATIONS

Prosecution History from U.S. Pat. No. 9,202,049, dated Aug. 13, 2013 through Aug. 5, 2015, 162 pp.

(Continued)

*Primary Examiner* — Kaveh Abrishamkar
(74) *Attorney, Agent, or Firm* — Shumaker & Sieffert, P.A.

(57) ABSTRACT

In one example, a mobile device includes a network interface configured to receive data for an application including a set of application permissions describing elements of the mobile device to which the application will have access upon installation of the application, and a processing unit configured to determine a type for the application and, based on an analysis of the set of application permissions and the type for the application, determine whether the application includes malware.

30 Claims, 11 Drawing Sheets

(56) References Cited

U.S. PATENT DOCUMENTS

| | | |
|---|---|---|
| 7,000,250 B1 | 2/2006 | Kuo et al. |
| 7,007,302 B1 | 2/2006 | Jagger et al. |
| 7,062,553 B2 | 6/2006 | Liang |
| 7,065,790 B1 | 6/2006 | Gryaznov |
| 7,069,594 B1 | 6/2006 | Bolin |
| 7,076,650 B1 | 7/2006 | Sonnenberg |
| 7,080,408 B1 | 7/2006 | Pak et al. |
| 7,086,090 B1 | 8/2006 | Dawson, Jr. et al. |
| 7,089,592 B2 | 8/2006 | Adjaoute |
| 7,096,368 B2 | 8/2006 | Kouznetsov et al. |
| 7,096,501 B2 | 8/2006 | Kouznetsov et al. |
| 7,146,642 B1 | 12/2006 | Magdych et al. |
| 7,150,042 B2 | 12/2006 | Wolff et al. |
| 7,155,742 B1 | 12/2006 | Szor |
| 7,171,689 B2 | 1/2007 | Beavers |
| 7,171,690 B2 | 1/2007 | Kouznetsov et al. |
| 7,203,959 B2 | 4/2007 | Nachenberg et al. |
| 7,210,168 B2 | 4/2007 | Hursey et al. |
| 7,228,565 B2 | 6/2007 | Wolff et al. |
| 7,231,440 B1 | 6/2007 | Kouznetsov et al. |
| 7,231,637 B1 | 6/2007 | McEwan |
| 7,243,373 B2 | 7/2007 | Muttik et al. |
| 7,251,830 B1 | 7/2007 | Melchione |
| 7,287,281 B1 | 10/2007 | Szor |
| 7,331,061 B1 | 2/2008 | Ramsey et al. |
| 7,426,383 B2 | 9/2008 | Wang et al. |
| 7,509,680 B1 | 3/2009 | Sallam |
| 7,515,926 B2 | 4/2009 | Bu et al. |
| 7,702,806 B2 | 4/2010 | Gil et al. |
| 7,748,038 B2 | 6/2010 | Olivier et al. |
| 7,778,606 B2 | 8/2010 | Ammon et al. |
| 8,255,280 B1 * | 8/2012 | Kay .................. G06F 21/53 705/26.1 |
| 8,726,386 B1 | 5/2014 | McCorkendale et al. |
| 8,769,676 B1 * | 7/2014 | Kashyap .............. G06F 21/554 726/22 |
| 9,202,049 B1 * | 12/2015 | Book .................... G06F 21/56 |
| 9,576,130 B1 * | 2/2017 | Book .................... G06F 21/56 |
| 2002/0042886 A1 | 4/2002 | Lahti et al. |
| 2002/0049862 A1 | 4/2002 | Gladney et al. |
| 2002/0066024 A1 | 5/2002 | Schmall et al. |
| 2002/0099518 A1 | 7/2002 | Tovinkere et al. |
| 2002/0116639 A1 | 8/2002 | Chefalas et al. |
| 2003/0023865 A1 | 1/2003 | Cowie et al. |
| 2003/0027551 A1 | 2/2003 | Rockwell |
| 2003/0065793 A1 | 4/2003 | Kouznetsov et al. |
| 2003/0074573 A1 | 4/2003 | Hursey et al. |
| 2003/0084321 A1 | 5/2003 | Tarquini et al. |
| 2003/0115483 A1 | 6/2003 | Liang |
| 2003/0120951 A1 | 6/2003 | Gartside et al. |
| 2003/0131248 A1 | 7/2003 | Huang |
| 2003/0159070 A1 | 8/2003 | Mayer et al. |
| 2003/0172294 A1 | 9/2003 | Judge |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2004/0002882 A1 | 1/2004 | Safa |
| 2004/0003276 A1 | 1/2004 | Kouznetsov et al. |
| 2004/0025042 A1 | 2/2004 | Kouznetsov et al. |
| 2004/0034794 A1 | 2/2004 | Mayer et al. |
| 2004/0060046 A1 | 3/2004 | Good et al. |
| 2004/0064737 A1 | 4/2004 | Milliken et al. |
| 2004/0098482 A1 | 5/2004 | Asano |
| 2004/0107342 A1 | 6/2004 | Pham et al. |
| 2004/0123117 A1 | 6/2004 | Berger |
| 2004/0172551 A1 | 9/2004 | Fielding et al. |
| 2004/0181687 A1 | 9/2004 | Nachenberg et al. |
| 2004/0209609 A1 | 10/2004 | Kouznetsov et al. |
| 2004/0235455 A1 | 11/2004 | Jiang |
| 2004/0228016 A1 | 12/2004 | Billhartz |
| 2004/0250115 A1 | 12/2004 | Gemmel et al. |
| 2004/0260775 A1 | 12/2004 | Fedele |
| 2005/0037733 A1 | 2/2005 | Coleman et al. |
| 2005/0055559 A1 | 3/2005 | Bucher |
| 2005/0108557 A1 | 5/2005 | Kayo et al. |
| 2005/0132184 A1 | 6/2005 | Palliyil et al. |
| 2005/0172337 A1 | 8/2005 | Bodorin et al. |
| 2005/0198051 A1 | 9/2005 | Marr et al. |
| 2005/0216749 A1 | 9/2005 | Brent |
| 2005/0216762 A1 | 9/2005 | Peikari |
| 2005/0229254 A1 | 10/2005 | Singh et al. |
| 2005/0251862 A1 | 11/2005 | Talvitie |
| 2006/0005244 A1 | 1/2006 | Garbow et al. |
| 2006/0026687 A1 | 2/2006 | Peikari |
| 2006/0031940 A1 | 2/2006 | Rozman et al. |
| 2006/0041863 A1 | 2/2006 | Saito |
| 2006/0048227 A1 | 3/2006 | Ohta et al. |
| 2006/0064755 A1 | 3/2006 | Azadet et al. |
| 2006/0075501 A1 | 4/2006 | Thomas et al. |
| 2006/0117386 A1 | 6/2006 | Gupta et al. |
| 2006/0130141 A1 | 6/2006 | Kramer et al. |
| 2006/0130144 A1 | 6/2006 | Wernicke |
| 2006/0150250 A1 | 7/2006 | Lee et al. |
| 2006/0161984 A1 | 7/2006 | Phillips et al. |
| 2006/0161985 A1 | 7/2006 | Zhao |
| 2006/0191011 A1 | 8/2006 | Korkishko et al. |
| 2006/0200863 A1 | 9/2006 | Ray et al. |
| 2006/0203736 A1 | 9/2006 | Molen et al. |
| 2006/0217111 A1 | 9/2006 | Marolia et al. |
| 2006/0217113 A1 | 9/2006 | Rao et al. |
| 2006/0236393 A1 | 10/2006 | Kramer et al. |
| 2006/0242709 A1 | 10/2006 | Seinfeld et al. |
| 2006/0253703 A1 | 11/2006 | Eronen et al. |
| 2006/0276173 A1 | 12/2006 | Srey et al. |
| 2006/0277408 A1 | 12/2006 | Bhat et al. |
| 2006/0278694 A1 | 12/2006 | Jha et al. |
| 2006/0282528 A1 | 12/2006 | Madams et al. |
| 2006/0288411 A1 | 12/2006 | Garg et al. |
| 2007/0028296 A1 | 2/2007 | Wachtler et al. |
| 2007/0030539 A1 | 2/2007 | Nath et al. |
| 2007/0056035 A1 | 3/2007 | Copley |
| 2007/0089172 A1 | 4/2007 | Bare et al. |
| 2007/0118759 A1 | 5/2007 | Sheppard |
| 2007/0192863 A1 | 8/2007 | Kapoor et al. |
| 2007/0217371 A1 | 9/2007 | Sinha |
| 2007/0239999 A1 | 10/2007 | Honig et al. |
| 2007/0240215 A1 | 10/2007 | Flores et al. |
| 2007/0240216 A1 | 10/2007 | O'Sullivan et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2007/0291945 A1 | 12/2007 | Chuang et al. |
| 2008/0016339 A1 | 1/2008 | Shukla |
| 2008/0086773 A1 | 4/2008 | Tuvell et al. |
| 2008/0086776 A1 | 4/2008 | Tuvell et al. |
| 2008/0096526 A1 | 4/2008 | Miettinen et al. |
| 2008/0178294 A1 | 7/2008 | Hu et al. |
| 2009/0254992 A1 | 10/2009 | Schultz et al. |
| 2011/0041179 A1 | 2/2011 | Stahlberg |
| 2011/0179484 A1 | 3/2011 | Tuvell et al. |
| 2012/0210431 A1 * | 8/2012 | Stahlberg ............... G06F 21/51 726/24 |
| 2012/0278892 A1 | 11/2012 | Turbin |
| 2012/0304310 A1 | 11/2012 | Blaisdell |
| 2013/0097660 A1 | 4/2013 | Das et al. |
| 2013/0333039 A1 | 12/2013 | Kelly |
| 2014/0366143 A1 * | 12/2014 | Sandler ................ G06F 21/577 726/25 |

OTHER PUBLICATIONS

Enck et al., "On Lightweight Mobile Phone Application Certification," CCS'09, Department of Computer Science and Engineering, Pennsylvania State University, Nov. 9-13, 2009, 11 pp.

Prosecution History from U.S. Pat. No. 9,576,130, dated Mar. 15, 2016 through Oct. 13, 2016, 22 pp.

* cited by examiner

DETECTING MALWARE ON MOBILE DEVICES

This application is a continuation of U.S. application Ser. No. 14/949,705, filed Nov. 23, 2015, which is a continuation of U.S. application Ser. No. 13/164,627, filed Jun. 20, 2011, which claims the benefit of U.S. Provisional Application No. 61/357,054, filed Jun. 21, 2010, each of which is hereby incorporated by reference.

TECHNICAL FIELD

This disclosure relates to computer networks, and more particularly, to detection of malicious data transferred via computer networks.

BACKGROUND

A computer network typically includes a collection of interconnected computing devices that exchange data and share resources. The devices typically include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting malicious data use pattern matching. In particular, an intrusion detection system ("IDS") applies regular expressions or sub-string matches to detect defined patterns within a data stream. Similarly, virus detection applications executed by an endpoint computing device, such as a personal computer, detects defined patterns in files retrieved by the endpoint computer device, where the files can be stored within an operating system of the endpoint computing device.

Use of cellular mobile devices for accessing computer data networks has recently increased dramatically. These mobile devices, often referred to as "smart" phones, provide a platform for both cellular phone calls and cellular-based access to computer data services. For example, a typical cellular radio access network is a collection of cells that each include base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services.

With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks.

The ubiquitous use of cellular mobile devices and the ever increasing desire by users for fast, secure network access from around the world has presented many challenges for enterprises. Enabling even basic connectivity across all desired cellular mobile device platforms can be a huge challenge. Enabling secure connectivity with an easy end-user experience can be even more challenging. For example, the dramatic increase in use of cellular mobile devices for computer data services has exposed service providers and enterprise networks to increased security risks presented by misconfigured devices.

Because users often lack technical experience, endpoint devices, including cellular mobile devices, often become misconfigured. That is, users may accidentally install viruses, spyware, or other software that can potentially damage the functionality of the endpoint device or compromise the security of the computer network to which the endpoint is coupled. Once affected, endpoint devices can inadvertently spread malicious software to the servers and possibly to other endpoint devices. As numerous different endpoint security and connectivity software applications are added to each end user mobile device, the potential for problems and network conflicts increases. It is currently very difficult for information technology (IT) staff to enable network connectivity for users from any device, at any time, from virtually anywhere, without requiring significant end-user interaction with complex technologies.

Conventionally, software on a mobile device attempts to detect malware, such as spyware, on the mobile device in a manner similar to that of endpoint computing devices. However, mobile devices are typically configured to prevent inspection by an executed malware application to certain portions of the mobile devices. Unfortunately, malicious data tends to be stored in the very regions to which malware detection applications do not have access.

SUMMARY

In general, this disclosure describes techniques for detecting malware, such as spyware, on mobile devices, such as cellular telephones. When a mobile device requests to retrieve an application from an application marketplace, the marketplace typically provides metadata associated with the application that indicates the type of application to be retrieved and permissions associated with the application. The permissions generally describe services, features, data, or other elements to which the application will have access upon retrieval and installation. In accordance with the techniques of this disclosure, a malware detection process executed by a mobile device generally inspects permissions associated with a target application, based on the application's type, to determine whether the target application represents malware. A separate system, in some examples, determines sets of permissions for various types of applications that are normal, and one or more permissions for various types of applications that are suspect, that is, that indicate that the application is or may be malware.

In one example, a method includes receiving, by a mobile device, data for an application including a set of application permissions describing elements of the mobile device to which the application will have access upon installation of the application, determining a type for the application, and, based on an analysis of the set of application permissions and the type for the application, determining whether the application includes malware.

In another example, a device includes a network interface configured to receive data for an application including a set of application permissions describing elements of the mobile device to which the application will have access upon installation of the application, and a processing unit configured to determine a type for the application and, based on an analysis of the set of application permissions and the type for the application, determine whether the application includes malware.

In another example, a system includes a plurality of mobile devices and a threat management center. The threat management center is configured to determine sets of permissions associated with various types of applications and to distribute the determined sets of permissions to the plurality of mobile devices. Each of the plurality of mobile devices is configured to receive data for an application including a set of application permissions describing elements of the mobile device to which the application will have access upon installation of the application, to determine a type for the application, and, based on an analysis of the set of application permissions, the type for the application, and the sets of permissions received from the threat management center, determine whether the application includes malware.

In another example, a computer-readable storage medium includes instructions that, when executed, cause a processor to receive data for an application including a set of application permissions describing elements of the mobile device to which the application will have access upon installation of the application, determine a type for the application, and, based on an analysis of the set of application permissions and the type for the application, determine whether the application includes malware.

The techniques of this disclosure may provide one or more advantages. For example, using these techniques, mobile devices may be equipped to detect applications that may include malware based on an analysis of only permissions of the applications. In many cases, malware detection applications are downloaded from an application marketplace, and are not provided within a core of a mobile device operating system. Therefore, the malware detection applications may not have access to underlying instructions for other applications, to determine if these other applications include malware using conventional techniques such as pattern matching. However, permissions for applications are typically available to all other applications. Therefore, the techniques of this disclosure may be implemented by a security application downloaded from an application market, and used to determine whether other applications potentially include malware based on analysis of the permissions of the other applications and without accessing underlying instructions for the other applications.

The details of one or more examples are set forth in the accompanying drawings and the description below. Other features, objects, and advantages will be apparent from the description and drawings, and from the claims.

DETAILED DESCRIPTION

Figure 1:
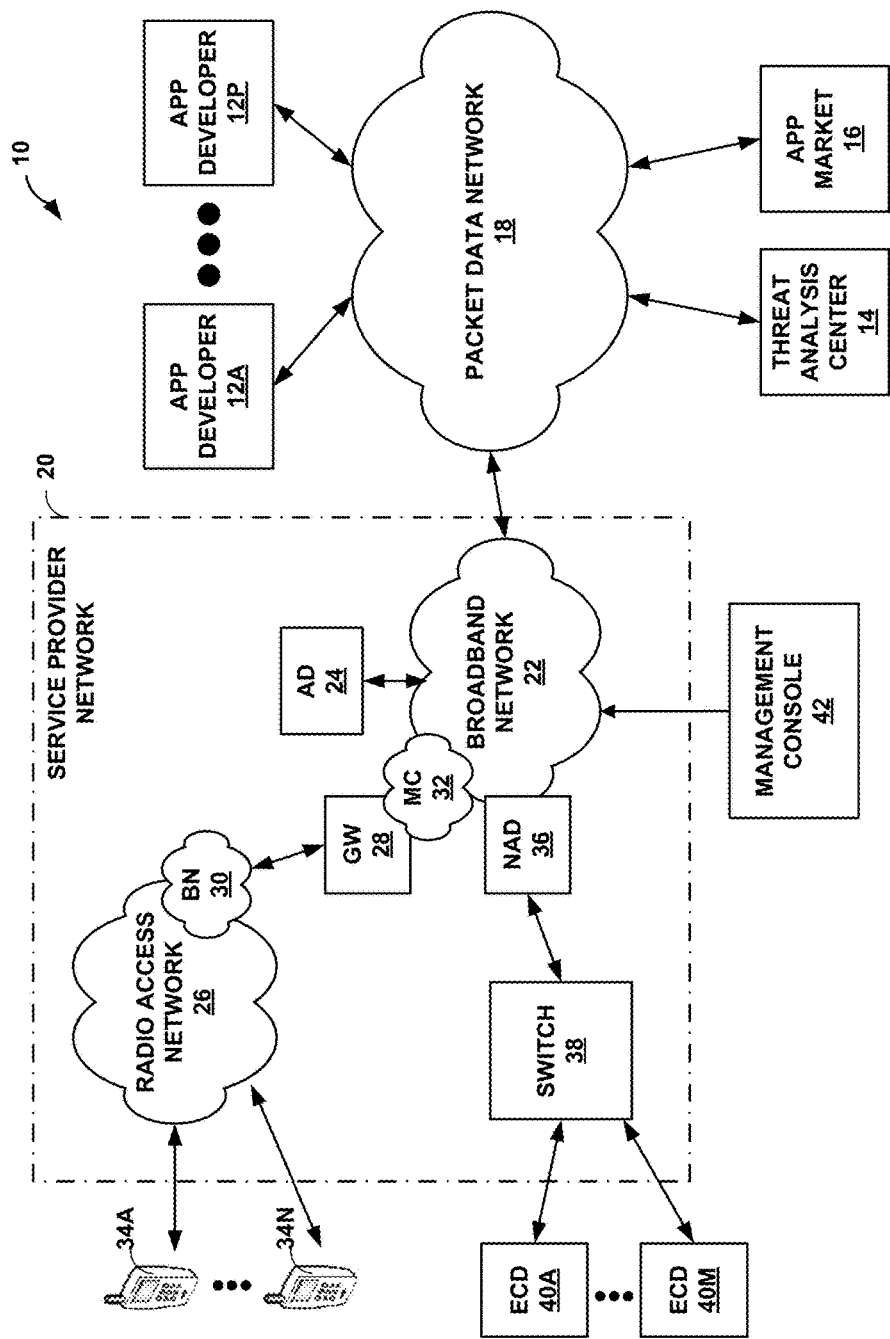
FIG. 1 is a block diagram illustrating an example system in which mobile devices are configured to detect malware in accordance with the techniques of this disclosure.

FIG. 1 is a block diagram illustrating an example system 10 in which mobile devices 34A-34N (mobile devices 34) are configured to detect malware in accordance with the techniques of this disclosure. For example, any or all of mobile devices 34 include malware detection modules that inspect permissions associated with files (such as applications) stored on respective mobile devices 34 to determine whether the files represent malware. In some examples, mobile device 34A includes a malware detection module that inspects permissions associated with a downloaded application (which may or may not be installed as of the time of the inspection) to determine whether the application is malicious, e.g., includes spyware or other malware. Although the techniques of this disclosure are generally described with respect to mobile devices, in some examples, endpoint computing devices 40 may implement these or similar techniques for determining whether a file includes malware.

In this example, system 10 includes packet data network 18 and service provider network 20. Packet data network 18 may represent the Internet. In general, service provider network 20 provides access to resources of packet data network 18 for mobile devices 34 and endpoint computing devices 40A-40M (ECDs 40). In some examples, mobile devices 34 and endpoint computing devices 40 correspond to devices of an enterprise network that are managed by management console 42. That is, in some examples, management console 42 sets policies for one or more of mobile devices 34 and/or endpoint computing devices 40. As discussed in greater detail below, in such examples, a user, such as an enterprise administrator, sets policies for devices of the enterprise, such as permitted or unpermitted types of applications. In accordance with the techniques of this disclosure, mobile devices 34 may be configured to detect not only applications that potentially include malware based on permissions of the applications, but also unpermitted applications based on permissions of the applications.

In the example of FIG. 1, endpoint computing devices 40 may be personal computers, laptop computers or other type of computing device associated with individual employees or other authorized users. In contrast, mobile devices 34 provide a platform for both cellular phone calls and cellular-based access to computer data services. That is, each of mobile devices 34 is a wireless communication device capable of cellular communications. Mobile devices 34 may comprise, for example, a mobile telephone, a laptop or desktop computer having, e.g., a 3G wireless card, a wireless-capable netbook, a tablet computer, a video game device, a pager, a smart phone, or a personal data assistant (PDA). Each of mobile devices 34 may run one or more applications, such as mobile calls, video games, videoconferencing, and email, among others.

Service provider network 20 also provides network access, data transport and other services to mobile devices 34. Service provider network 20 includes radio access network 26 in which one or more base stations communicate via radio signals with mobile devices 34. Backhaul network ("BN") 30 is a transport network that enables base stations of radio access network to exchange packetized data with mobile core network 32 of the service provider, ultimately for communication with broadband network 22 and packet data network 18. Backhaul network 30 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28 of mobile core network 32. In various aspects, backhaul network 30 may comprise a GSM radio access network (GRAN) or a Universal Mobile Telephony Service (UMTS) terrestrial radio access network (UTRAN) operating according to respective radio access network standards set forth by the relevant standards-setting body (e.g., 3GPP).

Mobile core network 32 provides session management, mobility management, and transport services between backhaul network 30 and broadband network 22 to support access, by mobile devices 34, to packet data network 18 and resources thereof. Mobile core network 32 may comprise, for instance, a general packet radio service (GPRS) core packet-switched network, a GPRS core circuit-switched network, an IP-based mobile multimedia core network, or another type of transport network. Mobile core network 32 may include one or more packet processing nodes to support firewall, load balancing, billing, deep-packet inspection (DPI), or other services for mobile traffic traversing the mobile core network.

In the example of FIG. 1, endpoint computing devices 40 connect to network access device 36 via network switch 38. In one example, network switch 38 may comprise digital subscriber line access multiplexers (DSLAMs) or other switching device. Each of endpoint computing devices 40 may utilize a Point-to-Point Protocol (PPP), such as PPP over ATM or PPP over Ethernet (PPPoE), to communicate with network switch 38. For example, using PPP, one of endpoint computing devices 40 may request access to broadband network 22 and provide login information, such as a username and password, for authentication by authentication device ("AD") 24. PPP may be supported on lines such as digital subscriber lines (DSLs) that connect endpoint computing devices 40 with network switch 38. In other examples, endpoint computing devices 40 may utilize a non-PPP protocol to communicate with network switch 38. Other examples may use other lines besides DSL lines, such as Ethernet over a T1, T3 or other access link.

Network switch 38 may communicate with network access device 36 over a physical interface supporting various protocols, e.g., ATM interface supporting ATM protocols. Network access device 36 typically includes Broadband Remote Access Server (BRAS) functionality to aggregate output from switches into a higher-speed uplink to broadband network 22. In some examples, network access device 36 may comprise a router that maintains routing information between endpoint computing devices 40 and broadband network 22.

As discussed above, mobile devices 34 execute various types of applications, such as applications for making telephone calls, games, checking news, weather, or traffic reports, providing maps for navigation, such as turn-by-turn navigation, performing business functions such as drafting documents or spreadsheets, e-mailing contacts, sending and receiving messages using the short message service (SMS), sending and receiving multimedia (such as pictures, recorded audio, or videos) using the multimedia message service (MMS), or other such applications. In the example of FIG. 1, application market (app market) 16 represents a repository from which mobile devices 34 retrieve such applications via packet data network 18. Application market 16 may correspond, for example, to the Google Android Market, Apple iTunes®, the Blackberry App World®, the Amazon App Store for Android, or the like. In some examples, there are multiple such repositories at various locations within system 10 (e.g., communicatively coupled to broadband network 22 and/or radio access network 26).

In some examples, applications are developed by third party developers, represented in FIG. 1 by application developers 12A-12P (app developers 12). Application developers 12 develop and submit developed applications to application market 16. While most of application developers 12 produce benign applications, unfortunately, some of application developers 12 incorporate malware in developed applications. In some examples, the submitted applications are reviewed for compliance with development standards, and to attempt to detect malware in the applications. However, even with such review, it is possible for applications stored by application market 16 to include undetected malware.

The techniques of this disclosure are directed to detecting malware in applications based on permissions associated with the applications. In general, when application developers 12 develop an application, the application will include a set of properties describing elements of a mobile device with which the application will interact regularly. These elements may include configuration data of the mobile device, data stored on a storage medium of the mobile device (such as, for example, flash memory), specific hardware units and/or software modules of the mobile device such as a global positioning system (GPS) unit, an SMS or MMS unit, a cellular telephone unit, or the like.

More particularly, the permissions may indicate whether the application will be permitted to read or write particular types of data, such as to a contact list, a calendar, owner data, audio data (e.g., to record or delete audio data stored on the phone), history data such as browser history or call log data, bookmarks, or the like. The permissions may also indicate whether the application will be permitted to place or receive calls, access location data (e.g., coarse location data such as that provided by distances relative to cellular towers or fine location data such as that provided by GPS), access Internet data, send or receive SMS or MMS data, manipulate use credentials, read or write to external storage (e.g., via a universal serial bus (USB) cable), or such tasks.

In accordance with the techniques of this disclosure, one or more of mobile devices 34 include security management modules configured to analyze permissions of applications to determine whether the applications include malware. In some examples, mobile devices 34 retrieve security management modules from application market 16 or threat analysis center 14. Mobile devices 34 also receive periodic updates to the security management modules from threat analysis center 14.

Threat analysis center 14 generally inspects applications of application market 16 to determine whether the applications include malware. In addition, threat analysis center 14 determines profiles of permissions for various types of applications that can be downloaded and executed by mobile devices 34. In general, the profiles conform to "normal" permissions associated with particular types of applications. That is, threat analysis center 14 generally determines permissions for various types of applications that are considered non-concerning. Moreover, threat analysis center 14 also determines permissions for various types of applications that are not normal. For permissions that are not normal, threat analysis center 14 may determine whether applications of a particular type associated with an unusual (that is, not normal) permission should be categorized as notable, suspicious, spyware, malware, or some other concerning category (e.g., another spyware or malware related category).

Threat analysis center 14 monitors applications on a regular basis to determine profiles indicating whether permissions for a type of application can be considered concerning or non-concerning. Accordingly, threat analysis center 14 periodically distributes updates to mobile devices 34 including updated indications of whether particular types of applications are commonly associated with particular types of permissions. In this manner, mobile devices 34 can use the profiles received from threat analysis center 14 to determine whether downloaded and installed applications include malware, such as spyware, based on the permissions of the applications.

It should be understood that the type of application may influence whether certain permissions are considered normal or not. That is, the permissions that cause one type of application to be classified as concerning do not necessarily cause another type of application to be classified as concerning. For example, for types of applications having to do with calendaring features, such as setting appointments or reminders for appointments, it would be expected that such applications may read and/or write to the user's calendar. However, gaming applications would typically not need access to the user's calendar. Therefore, in some examples, threat analysis center 14 may determine that gaming applications that have permissions related to calendar access may represent malware, such as spyware. However, threat analysis center 14 may also determine that types of applications related to appointments or schedules having permissions related to calendar access likely do not represent malware.

Management console 42 provides enterprise administrators with the ability to set policies for mobile devices 34 and endpoint computing devices 40. In some examples, an enterprise administrator uses management console 42 to establish policies that distinguish between permitted and unpermitted applications for, e.g., mobile devices 34. The administrator further determines permissions associated with various types of applications that can be used to distinguish between permitted and unpermitted applications. In this manner, the techniques of this disclosure may be used not only to detect applications that may include malware, but also to detect applications that are not permitted due to corporate policy, based on permissions for the application. In addition, or in the alternative, the administrator may use management console 42 to define policies that indicate permitted or unpermitted applications based only on a name for the application, a type for the application, or other characteristics of the application. In other examples, rather than being used to enforce a corporate policy, management console 42 may be used to enforce parental controls set by a parent or other guardian of a minor who possesses one of mobile devices 34.

Figure 2:
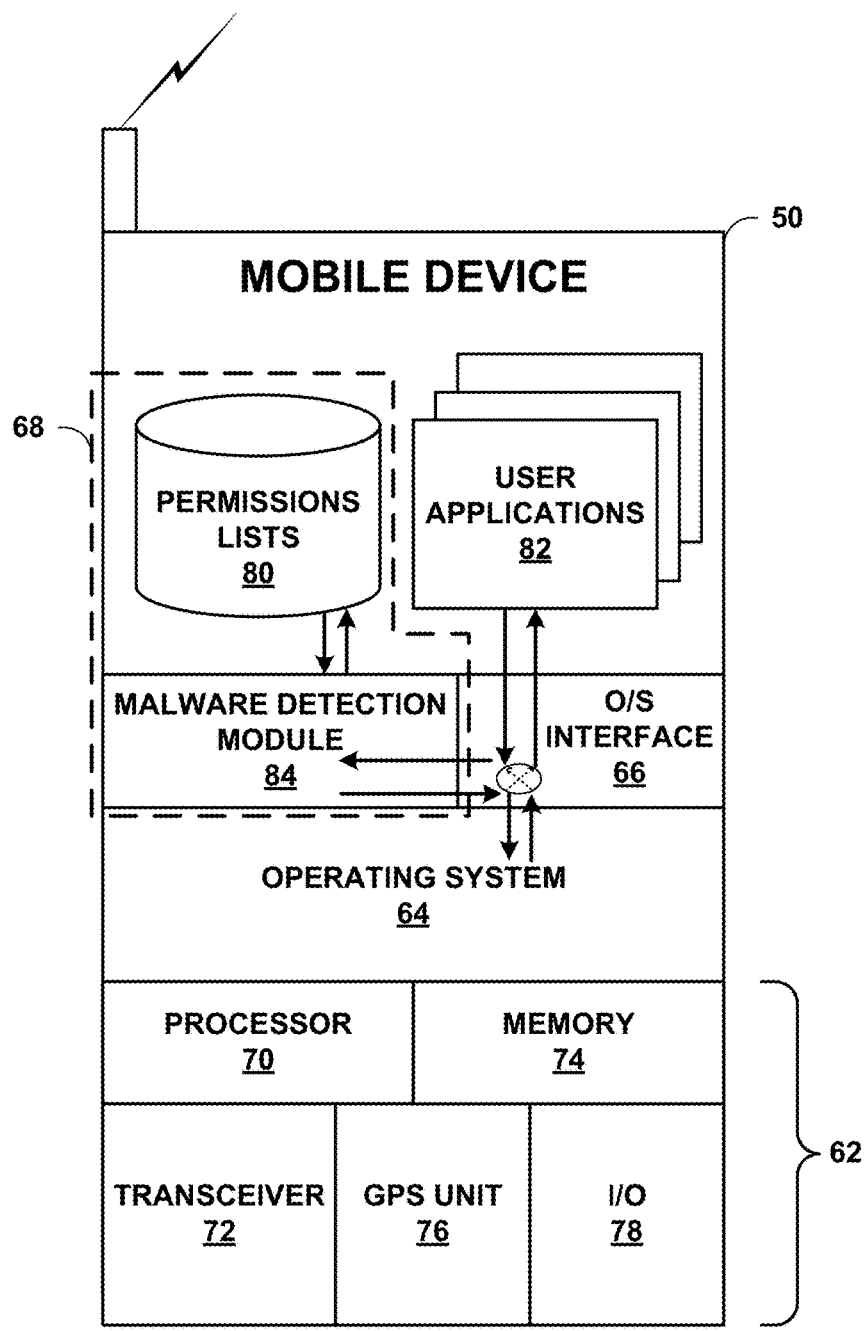
FIG. 2 is a block diagram illustrating an example mobile device, which may generally correspond to one of the mobile devices of FIG. 1.

FIG. 2 is a block diagram illustrating an example mobile device 50, which may generally correspond to one of mobile devices 34 of FIG. 1. Each of mobile devices 34 may include components similar to those illustrated in the example of FIG. 2. In this example, mobile device 50 includes hardware 62 that provides core functionality for operation of the device. Hardware 62 may include one or more programmable microprocessors 70 configured to operate according to executable instructions (i.e., program code), stored in memory 74, which generally corresponds to a computer-readable storage medium. Memory 74 may include any or all of read-only memory (ROM), random access memory (RAM), flash media, or the like. Transmitter/receiver (transceiver) 72 communicates with other communication devices via a wireless communication, such as high-frequency radio frequency (RF) signals.

In some examples, mobile device 50 includes multiple transceivers or other radio units for wireless communication, each of which may conform to different communication standards (e.g., 3G, 4G, long-term evolution (LTE), Bluetooth®, and the like). Transceiver 72 may also be generally referred to as a network interface, in that transceiver 72 can be configured to send and receive data that ultimately can traverse broadband network 22 and packet data network 18.

In this example, hardware 62 includes global positioning system (GPS) unit 76. GPS unit 76 receives signals from GPS satellites for determining a geographical position of mobile device 50. In some examples, one or more of user applications 82 include permissions that allow the respective applications to access fine position data from GPS unit 76, e.g., a precise latitude and longitude for mobile device 50. In some examples, one or more of user applications 82 include permissions that allow the respective applications to access coarse position data, which may be determined based on, e.g., signal strengths from one or more cellular towers that send and receive signals to/from transceiver 72. In this manner, user applications 82 may access either or both of coarse and fine position data, based on the permissions of the applications.

Hardware 62 also includes an input/output (I/O) interface 78, which may include one or more user interfaces such as, for example, a display, a touchscreen display, a keyboard, buttons, or the like, as well as interfaces for cables that can be coupled to mobile device 50, such as, for example, universal serial bus (USB) cables, micro-USB cables, high definition multimedia interface (HDMI) cables, audio cables, microphone cables, or the like. Hardware 62 may include additional discrete digital logic or analog circuitry.

Operating system 64 executes on microprocessor 70 and provides an operating environment for one or more applications (commonly referred to "apps"), such as user applications 82. Operating system (O/S) interface 66 proves an interface layer of software capable of making kernel calls into operating system 64. In some examples, O/S interface 66 provides one or more application programming interfaces (APIs) that can be called by user applications 82. In other words, O/S interface 66 provides a framework within which user applications 82 operate and may, for example, allow user applications 82 to execute within a "user" space of the operating environment provided by mobile device 50. O/S interface 66 may allow other forms of protocol handlers to be "plugged in" for interfacing with operating system 64.

In accordance with the techniques of this disclosure, mobile device 50 includes a security management module 68, which includes malware detection module 84 and permissions lists 80. In general, malware detection module 84 is configured to determine whether user applications 82 include malware, in accordance with the techniques of this disclosure. Security management module 68 may also receive configuration data that prevents execution of certain applications that do not conform to a corporate policy or parental controls.

Memory 74 stores instructions for user applications 82. In particular, memory 74 includes a region for user applications 82, which includes instructions for malware detection module 84. In general, user applications 82 do not have access to data of this region of memory 74. That is, user applications 82 cannot access data storing instructions for other ones of user applications 82, even in read-only mode. In some examples, malware detection module 84 is a user-installed application, e.g., one of user applications 82, and therefore has the same abilities and restrictions as user applications 82. That is, in some examples, malware detection module 84 does not have access to instructions for user applications 82.

More particularly, as discussed above, O/S interface 66 provides various tools by which user applications 82 and security management module 68 interact with elements of mobile device 50, such as hardware 62. However, in general, O/S interface 66 does not provide tools by which user applications 82 and security management module 68 are able to access the region including instructions for user applications 82. Processor 70 has access to this region in order to execute the instructions for user applications 82 and security management module 68, but user applications 82 and security management module 68 are not provided with tools for reading or writing to this region of memory 74. O/S interface 66 may provide read and/or write access to other regions of memory 74, e.g., to store configuration data or other data (e.g., recorded audio, pictures, or video, text, documents, and the like), but generally does not provide access to the region in which application instructions are stored to the applications.

Accordingly, in some examples, malware detection module 84 is unable to detect malware in user applications 82 using conventional methods, such as performing pattern matching to determine whether instructions for user applications 82 conform to a pattern for known malware. However, in accordance with the techniques of this disclosure, malware detection module 84 is still able to detect malware based on analysis of permissions for user applications 82.

In the example of FIG. 2, security management module 68 includes permissions lists 80. In general, data for permissions lists 80 is stored in memory 74, e.g., in a read/write area of memory 74 external to the region to which applications do not have access. Security management module 68 receives data for permissions lists 80 from threat analysis center 14 (FIG. 1) via transceiver 72. Permissions lists 80 include lists (also referred to as "sets") of permissions for various types of applications.

In some examples, permissions lists 80 include lists of "normal" permissions for various types of applications. A set of "normal" permissions indicates those permissions, for a given type of application, that are conventionally associated with the type of application. For example, a web browsing application would be expected to read and write bookmark data, browsing history data, and to send and receive data in accordance with hypertext transfer protocol (HTTP). Therefore, if one of user applications 82 purporting to be a web browser includes permissions directed to reading and writing bookmark data, browsing history data, and sending and receiving data in accordance with HTTP, such an application would not likely be determined to include malware in accordance with the techniques of this disclosure, based on these assumptions.

When a particular application includes a permission that is not in the "normal" set of permissions for that type of application, malware detection module 84 determines whether the permission is concerning. In some examples, permissions lists 80 include one or more lists of "concerning" permissions, which may be associated with a type of application or a general, globally applicable concerning permissions list. Accordingly, when an application includes a permission that is not in the normal set of permissions for that type of application, malware detection module 84 determines whether the permission is in the concerning permissions list. If so, malware detection module 84 determines that the application likely includes malware.

As an example, again referring to a web browsing application, a permission that would allow the application to end a call that is currently in progress would probably not be normal, and in fact, would probably be indicative of malware. Therefore, malware detection module 84 may determine that a web browsing application listing a permission that indicates that the application will have the ability to end a call that is currently in progress includes malware. It should be understood that this case is merely an example, and that other examples are possible. Moreover, in general, as discussed above, data of permission lists 80 are received from threat analysis center 14, which determines what permissions are normal for various types of applications, as well as which permissions should be considered concerning.

In other examples, permissions lists 80 additionally or alternatively include lists of permissions associated with various types of applications that are considered concerning, without necessarily including sets of "normal" permissions for the various types of applications. Accordingly, in these examples, malware detection module 84 may determine that an application of a particular type with a permission in the list of permissions indicated as being concerning for that type of application likely includes malware. In this manner, permissions lists 80 may include either or both of normal permissions for various types of applications and concerning permissions for the various types of applications.

Different types of applications can have different permissions that are considered concerning or normal. In general, threat analysis center 14 determines which permissions are considered concerning or normal for various types of applications. Accordingly, threat analysis center 14 distributes lists of permissions for various types of applications to mobile device 50. Security management module 68 stores these lists as permissions lists 80, and malware detection module 84 uses permissions lists 80 to determine whether user applications 82 include malware based on permissions of user applications 82.

When malware detection module 84 determines that one of user applications 82 likely includes malware, based on an analysis of permissions for the application and the type for the application, malware detection module 84 may trigger a mitigation action. Mitigation actions can include any or all of deleting the application, quarantining the application, generating user alert, requesting that the user delete or disable the application, sending a message to an external entity (such as threat analysis center 14, a management console, or other mobile devices) that indicates that the application likely includes malware, or other similar actions.

As noted above, in some examples, malware detection module 84 prompts a user with an indication that an application may include malware after determining that the application may include malware, based on an analysis of the permissions associated with the application. For example, I/O interface 78 may include a display that presents a graphical user interface indicating that a particular application may include malware and a request that the user delete the application. From this user interface, the user may elect to delete the application, or the user interface may direct the user to a different interface by which the user may delete the application.

Figure 3:
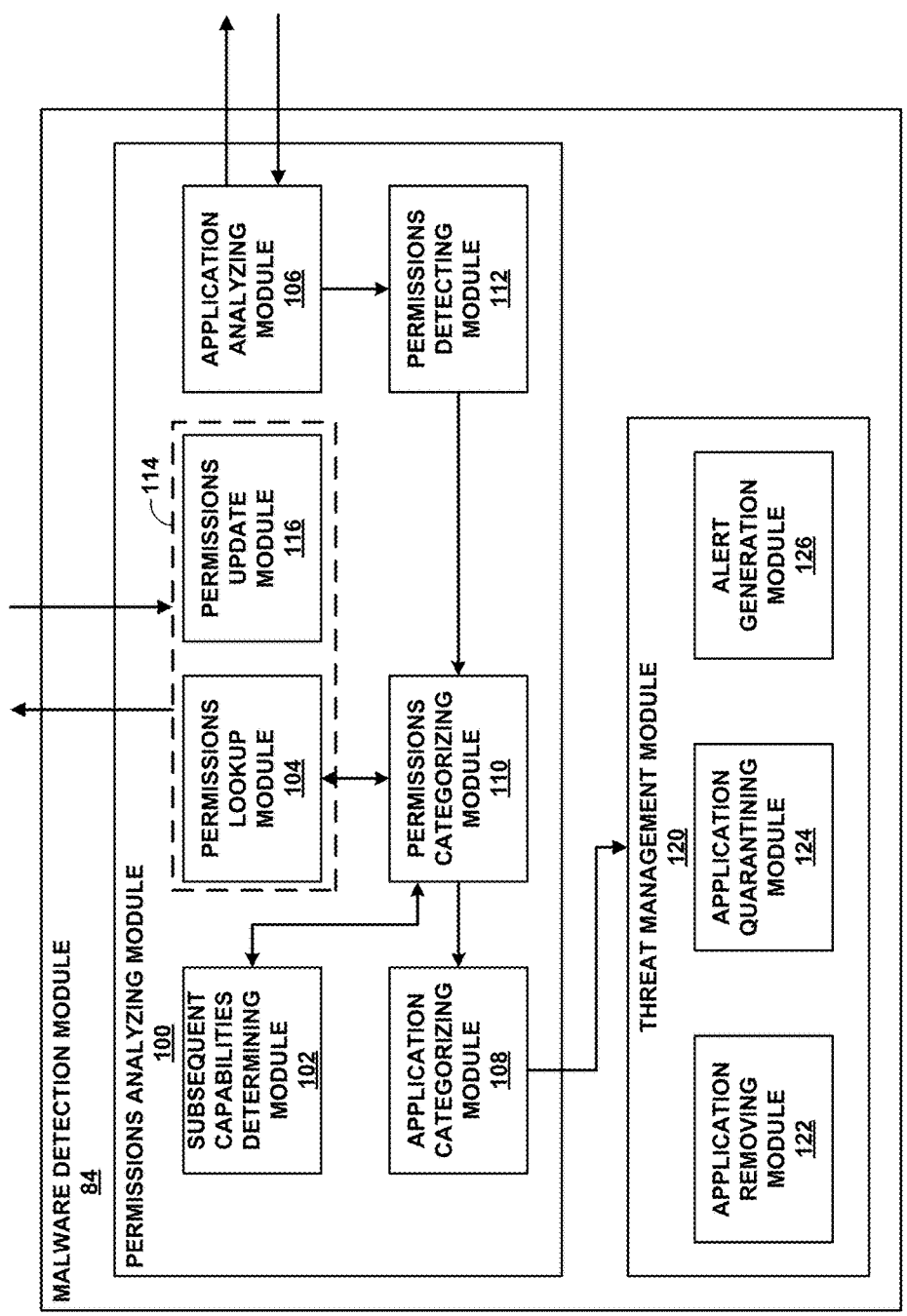
FIG. 3 is a block diagram illustrating an example set of components of a malware detection module.

FIG. 3 is a block diagram illustrating an example set of components of malware detection module 84 of FIG. 2. In this example, malware detection module 84 includes permissions analyzing module 100 and threat management module 120. Malware detection module 100 includes subsequent capabilities determining module 102, permissions query module 114 (including permissions lookup module 104 and permissions update module 116), application analyzing module 106, application categorizing module 108, permissions categorizing module 110, and permissions detecting module 112. In general, permissions analyzing module 100 analyzes permissions of a target application to determine whether the target application includes malware. Although separate modules are illustrated for performing the functions attributed to permissions analyzing module 100 in FIG. 3, it should be understood that any or all of the modules may be functionally integrated.

In this example, application analyzing module 106 receives a set of permissions associated with a target application. The target application may correspond to an application that mobile device 50 is about to download and for which mobile device 50 has received the set of permissions. In general, when mobile device 50 interacts with application market 16 to request a new application, application market 16 provides a set of permissions for the application, describing elements of mobile device 50 to which the application will have access, as discussed above. Accordingly, after mobile device 50 receives these permissions, application analyzing module 106 receives the permissions associated with the application. Alternatively, the target application may correspond to a previously installed application, e.g., one of user applications 82. Application analyzing module 106 also determines a type for the application. Application analyzing module 106 provides the set of permissions and the type to permissions detecting module 112.

Permissions detecting module 112 determines individual permissions from the set of permissions received for the target application. In some examples, permissions detecting module 112 and application analyzing module 106 are functionally integrated, but are illustrated separately for purposes of example and explanation. In this example, whereas application analyzing module 106 generally analyzes a target application to extract the set of permissions for the application, permissions detecting module 112 extracts the individual permissions for the application. Permissions detecting module 112 passes the individual permissions to permissions categorizing module 110, along with the type for the application, in this example. In some examples, permissions categorizing module 110 interacts with subsequent capabilities determining module 102 to determine capabilities associated with a particular permission, that is, the types of actions the target application will be permitted to perform based on a particular permission.

Permissions categorizing module 110 passes an indication of the type for the application to permissions lookup module 104. Permissions lookup module 104, in turn, queries permissions lists 80 using the type for the application to retrieve a set of permissions associated with the type for the application. As discussed above, the permissions associated with the type for the application may include either or both of a set of concerning permissions or a set of normal permissions. In any case, permissions lookup module 104 provides the set of permissions for the type of application to permissions categorizing module 110. Permissions categorizing module 110, in turn, categorizes the permissions for the target application, based on the concerning and/or normal permissions for the type of application, as received from permissions lookup module 104. For example, permissions categorizing module 110 generally determine whether any of the permissions associated with the application are concerning, or whether the permissions are normal, for the type of application.

In the example of FIG. 3, permissions analyzing module 100 includes permissions query module 114, which generally interacts with permissions lists 80 (FIG. 2). For example, permissions lookup module 104 queries permissions lists 80 as discussed above to retrieve stored lists of permissions. In addition, permissions query module 114 includes permissions update module 116, which is configured to update permissions lists 80. As described in greater detail with respect to FIG. 3, malware detection module 84 periodically receives updates to permissions lists 80. For example, a software update to malware detection module 84 may provide additional lists, additional elements to one or more lists, or removal of elements from one or more lists, as updates to permissions lists 80. Malware detection module 84 receives these updates from threat analysis center 14, in some examples. Permissions update module 116 interacts with permissions lists 80 to update one or more permissions lists of permissions lists 80 (or to add or remove lists from permissions lists 80) in response to such updates from threat analysis center 14.

In some examples, permissions categorizing module 110 receives a set of normal permissions for the type of application from permissions lookup module 104. In such examples, permissions categorizing module 110 determines whether the permissions detected by permissions detecting module 112 for the target application are normal. That is, for each of the permissions associated with the target application, permissions categorizing module 110 determines whether the permission is included in the set of normal permissions associated with the type for the application. If so, permissions categorizing module 110 categorizes the permission as concerning. Permissions categorizing module 110 determines whether permissions that are not considered normal should be categorized as concerning. In some examples, permissions lookup module 104 provides a set of generally concerning permissions to permissions categorizing module 110. When a permission associated with the target application is not considered normal and is included in the set of generally concerning permissions, permissions categorizing module 110 determines that the permission is concerning.

In other examples, permissions categorizing module 110 receives a set of concerning permissions for the type of application from permissions lookup module 104. In such examples, permissions categorizing module 110 determines whether the permissions detected by permissions detecting module 112 for the target application are concerning. That is, for each of the permissions associated with the target application, permissions categorizing module 110 determines whether the permission is included in the set of concerning permissions associated with the type of application. If so, permissions categorizing module 110 categorizes the permission as concerning.

As discussed above, in some examples, permissions categorizing module 110 categorizes certain permissions as concerning, either globally (that is, regardless of the type for the application) or based on the type for the application. In some examples, concerning permissions may include any or all of permissions that allow the application to access a coarse location of the mobile device, allow the application to access a fine location of the mobile device, allow the application to disable the mobile device, allow the application to initiate a phone call without presenting a dialer user interface by which the mobile device receives confirmation of the call to be placed from a user, allow the application to call any phone number without presenting the dialer user interface, allow interaction with or notification of user driven events (such as key presses or touch screen interaction events), allow the application to access a list of accounts in an accounts service, allow the application to open network sockets, allow the application to monitor, modify, or abort outgoing calls, allow the application to read calendar data of the mobile device, allow the application to read contacts data of the mobile device, allow the application to read data associated with an owner of the mobile device, allow the application to read short message service (SMS) messages, allow the application to monitor incoming multimedia message service (MMS) messages, allow the application to process SMS and MMS messages, allow the application to record audio, allow the application to send SMS messages, allow the application to request authentication tokens from an account manager, allow the application to write to external storage, allow the application to write browsing history data for the mobile device, allow the application to write bookmark data for the mobile device, and allow the application to write to the data associated with the owner for the mobile device.

Permissions categorizing module 110 provides categories for each of the permissions to application categorizing module 108. In general, application categorizing module 108 categorizes the target application based on whether the set of permissions for the target application include one or more concerning permissions. In some examples, when at least one of the permissions is categorized as concerning, applications categorizing module 108 categorizes the application as likely including malware. In some examples, application categorization module 108 categorizes the application as one of suspicious, notable, or malware. In some examples, application categorizing module 108 categorizes the application based on a number of concerning permissions associated with the target application by comparing the number of concerning permissions to threshold numbers (that is, predetermined numbers) of concerning permissions associated with the various categories. For example, the "suspicious" category may correspond to one concerning permission, the "notable" category may correspond to three concerning permissions, and the "malware" category may correspond to five or more permissions. Application categorization module 108 generally categorizes applications having no concerning permissions (e.g., all normal applications) as benign, or some other category indicating that the application does not include malware as determined by permissions analyzing module 100.

When application categorizing module 108 determines a category to the target application other than benign, application categorizing module 108 sends an indication of the category assigned to the target application to threat management module 120. In this example, threat management module 120 includes application removing module 122, application quarantining module 124, and alert generation module 126. In some examples, threat management module 120 includes only alert generation module 126, or the functional equivalent thereof, as discussed below.

Threat management module 120 is configured to respond to applications determined to possibly include malware. In some examples, threat management module 120 determines how to respond to applications possibly including malware based on the category assigned by application categorizing module 108. Application removing module 122 is configured to remove applications that possibly include malware, as determined by permissions analyzing module 100. That is, application removing module 122 is configured to use tools provided by O/S interface 66 to instruct the operating system to remove the instructions for a target application determined to possibly include malware from memory 74.

Application quarantining module 124 is configured to quarantine applications that possibly include malware, as determined by permissions analyzing module 100. Quarantining generally refers to isolating the instructions for the application without actually deleting them. Threat management module 120 may determine to quarantine an application, rather than deleting the application, to perform further analysis of the application. For example, quarantining the application may allow another module of malware detection module 84 (not shown in FIG. 3) to inspect the application, or to submit data for the application to threat analysis center 14. Threat analysis center 14, or the other module of malware detection module 84, may perform additional testing of the application to determine whether the application includes malware, and to respond to mobile device 50 with information indicating whether the application includes malware. If the application does not include malware, application quarantining module 124 can simply remove the application from quarantine. On the other hand, if the application is determined to include malware, application quarantining module 124 may cause application removing module 122 to remove (that is, delete) the application.

Alert generation module 126 generates an alert indicating that permissions analyzing module 100 has determined that an application possibly includes malware. That is, in some examples, alert generation module 126 interacts with O/S interface 66 to present, via I/O interface 78, a graphical user interface that presents an indication of the application that permissions analyzing module 100 determined included malware. Furthermore, in some examples, the graphical user interface provides an indication of a severity of the malware and/or a value indicative of confidence that the application includes malware. For example, alert generation module 126 may cause the graphical user interface to present an indication of the category assigned by application categorizing module 108 (e.g., suspicious, notable, or malware). Furthermore, in some examples, the graphical user interface provides a mechanism by which a user can remove or quarantine the application determined to possibly include malware.

In some examples, in addition to permissions that indicate that a target application potentially includes malware, permissions lookup module 104 retrieves sets of permissions that are indicative of unpermitted applications. As discussed above, an administrator, such as a corporate administrator or a parent of a minor, may determine that certain applications are not permitted. In accordance with the techniques of this disclosure, application categorizing module 108 may further determine that an application is categorized "not permitted," based on permissions received from permissions categorizing module 110 based on the type for the application. Threat management module 120 may also prevent execution of such applications, and alert generation module 126 may present a graphical user interface identifying the application and presenting a message that the application has been blocked because it is not permitted.

Figure 4:
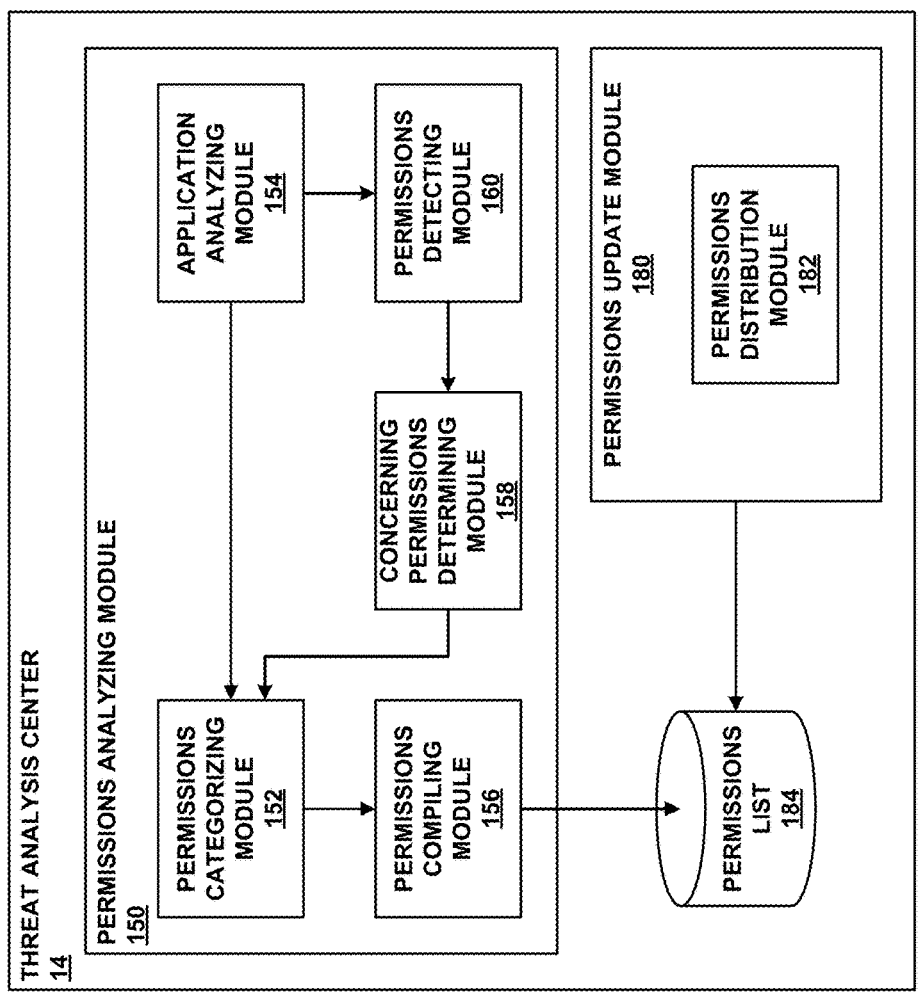
FIG. 4 is a block diagram illustrating an example set of components of a threat analysis center.

FIG. 4 is a block diagram illustrating an example set of components of threat analysis center 14. In this example, threat analysis center 14 includes permissions analyzing module 150 and permissions update module 180. These modules, and sub-modules thereof, may be implemented in hardware, software, firmware, or any combination thereof. When these modules are implemented in software or firmware, threat analysis center 14 also includes corresponding hardware to execute the software or firmware, such as one or more processors or processing units and a memory to store instructions for the software or firmware.

In this example, permissions analyzing module 150 includes application analyzing module 154, permissions categorizing module 152, permissions compiling module 156, concerning permissions determining module 158, and permissions detecting module 160. In general, permissions analyzing module 150 determines permissions of various types of applications to distinguish normal and concerning permissions for the various types of applications. Unlike permissions analyzing module 100 of malware detection module 84 in FIG. 2, permissions analyzing module 150 determines permissions associated with applications that are known to either include malware or not include malware.

In this example, application analyzing module 154 analyzes various applications to extract a type for each of the applications and a set of permissions associated with each of the applications. Application analyzing module 154 provides the set of permissions to permission detecting module 160 and the type for the application to permissions categorizing module 152. Permissions detecting module 160 extracts individual permissions from the set of permissions and provides the individual permissions to concerning permissions determining module 158. Concerning permissions determining module 158 generally determines whether individual permissions should be considered concerning or not. In some examples, concerning permissions determining module 158 receives an indication from a user, such as an administrator, as to whether a particular permission should be considered concerning.

Concerning permissions determining module 158 provides indications of concerning permissions to permissions categorizing module 152. Although certain permissions may be considered concerning for some types of applications, the same permissions may be considered normal or not concerning for other types of applications. In some cases, a permission may be considered concerning regardless of the type of application requesting that permission. For example, a permission that would allow an application to disable the mobile device on which the application is executing (sometimes referred to as "bricking" the mobile device) would likely be considered concerning for any application. Other permissions, such as permissions that allow access to GPS unit data, may be considered concerning for, e.g., game applications, but not concerning for, e.g., weather or map/navigation applications. Similarly, some permissions may be considered benign for all types of applications.

In general, concerning permissions determining module 158 determines permissions of the application that may be considered concerning for some applications, as discussed above. Permissions categorizing module 152 determines whether the permissions for a particular application should be considered concerning. Permissions compiling module 156 maintains records in the form of permissions lists 184, including sets of permissions that are normally requested for various types of applications and concerning permissions for various types of applications. Permissions categorizing module 152 requests a set of normal permissions for the type for the application from permissions compiling module 156, in some examples. In this manner, permissions categorizing module 152 can determine whether permissions for an application are considered normal, based on a comparison to the recorded permissions for the various types of applications that have been previously analyzed.

Permissions categorizing module 152 categorizes normal permissions for the target application as such, and other permissions, identified by concerning permissions determining module 158 as "concerning," as concerning.

Moreover, when permissions categorizing module 152 receives an indication that a particular application includes malware, permissions categorizing module 152 determines a set of one or more permissions associated with the application that can be used to identify the application and/or other similar types of applications as including malware. For example, permissions categorizing module 152 determines whether any of the permissions for the application are not in the set of "normal" permissions for that type of application, and may then determine that the permissions not in the set of normal permissions are concerning.

In some examples, permission categorizing module 152 presents a list of all permissions for a particular application to a user and requests that the user indicate whether any or all of the permissions should be considered concerning. Concerning permissions determining module 158 may also be configured to operate in this manner. Accordingly, in such examples, a user indicates categories for the various permissions. Permissions categorizing module 152 provides indications of the categories to which the permissions are assigned, based on the user input, to permissions compiling module 156, in these examples.

Permissions compiling module 156 determines lists of permissions associated with various types of applications, such as normal permissions and concerning permissions associated with the various types of applications. Permissions compiling module 156 stores the lists of permissions to permissions list 184. In addition, permissions update module 180 determines whether any new permissions have been associated with a particular type of application, e.g., whether a particular permission has been associated with a type of application and classified as concerning or normal for the type of application. When permissions list 184 is updated, permissions distribution module 182 distributes updates to mobile devices 34 (FIG. 1). Similarly, when permissions analyzing module 150 categorizes a permission as globally concerning, permissions distribution module 182 sends an update indicating the permission and an indication that the permission is considered globally concerning.

Figure 5:
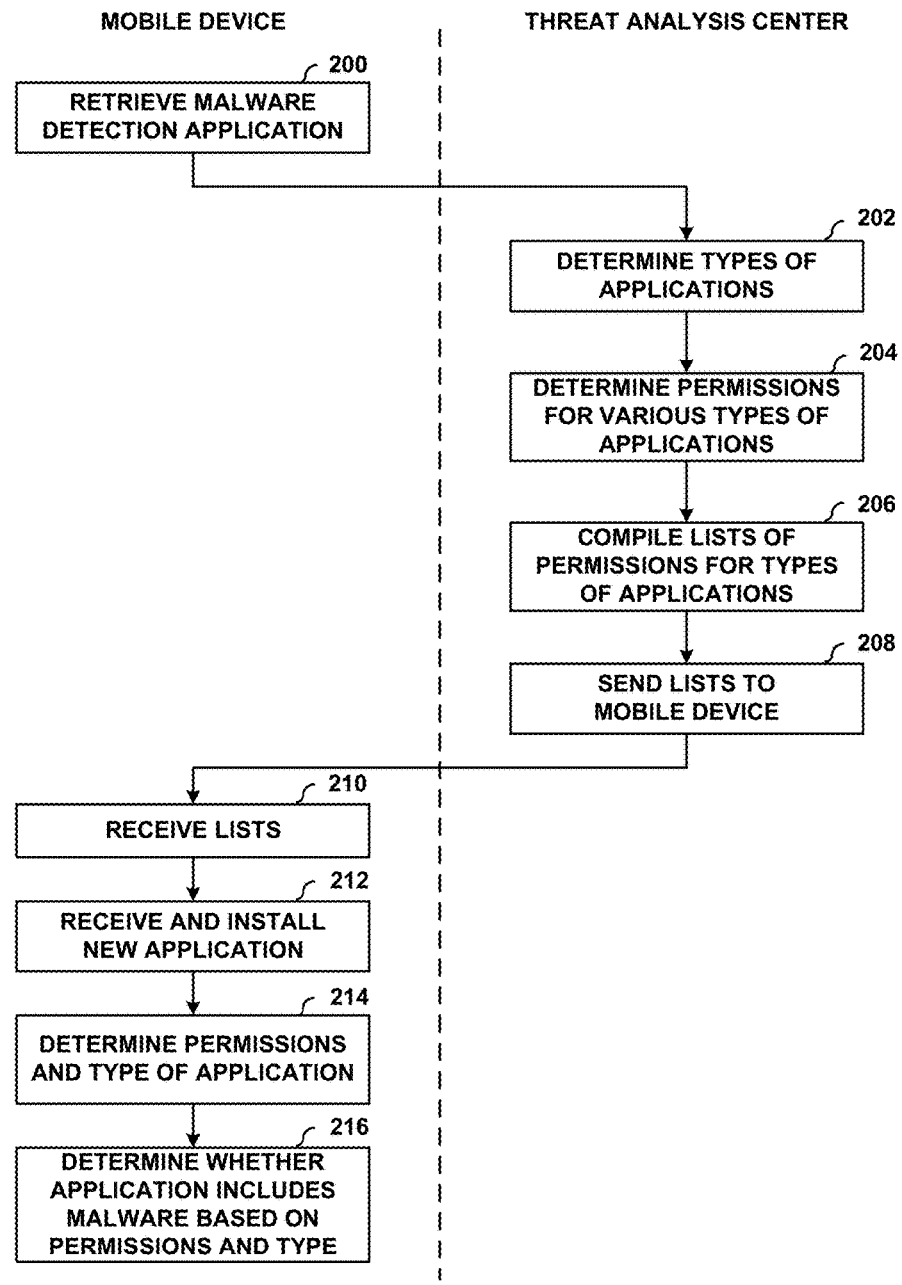
FIG. 5 is a flowchart illustrating an example method for determining whether an application potentially includes malware based on an analysis of permissions of the application.

FIG. 5 is a flowchart illustrating an example method for determining whether an application potentially includes malware based on an analysis of permissions of the application. The method of FIG. 5 is explained with respect to mobile device 50 (FIG. 2) and threat analysis center 14 (FIG. 3) for purposes of example. It should be understood, however, that in other examples, other devices can be configured to perform similar techniques. Moreover, the steps of the method may be performed in a different order or in parallel, and additional steps may be performed, without departing from the techniques of this disclosure.

Initially, in this example, mobile device 50 retrieves a malware detection application (200). For example, mobile device 50 may retrieve instructions for malware detection module 84 from application market 16, threat analysis center 14, or an Internet repository. In some examples, the retrieved malware detection application causes mobile device 50 to send information to threat analysis center 14 that mobile device 50 has retrieved malware detection module 84, such as a username and password, an e-mail address, a telephone number associated with mobile device 50, a registration number, or other information such as other credentials. In some examples, mobile device 50 also sends a request for updates of permissions lists associated with malware detection module 84 to threat analysis center 14.

Threat analysis center 14 determines various types of applications (202) and permissions associated with the various types of applications (204). For example, as discussed above, threat analysis center 14 analyzes applications of application market 16 to determine types for the various applications, as well as permissions that are considered normal or concerning for the various types of applications. As also discussed above, threat analysis center 14 may be configured to analyze the permissions autonomously (that is, to determine whether permissions are considered normal or concerning automatically) or with input from a user. In any case, threat management center 14 compiles lists of permissions for various types of applications (206). The lists may include a list of "normal" permissions for a particular type of application, a list of "concerning" permissions for a particular type of application, and/or a list of globally "concerning" permissions, that is, permissions that are considered concerning for any application regardless of type. Steps 202, 204, and 206 can be performed at any time, and are generally performed periodically or continuously, and not necessarily in response to a received request from mobile device 50.

In response to the request from mobile device 50, threat analysis center 14 sends lists of permissions for various types of applications to mobile device 50 (208). Generally, threat analysis center 14 sends updates to the lists of permissions to mobile device 50, e.g., in response to a request from mobile device 50, on a periodic basis (e.g., daily, weekly, monthly), or anytime the lists are changed. Although malware detection module 84 retrieved by mobile device 50 typically includes lists of permissions that can be used to determine whether an application potentially includes malware, threat analysis center 14 continuously monitors applications for mobile devices 34 to keep the lists up to date. In some examples, the lists of permissions are associated with a current list version or other tracking number, which mobile device 50 includes in a request for updates to threat analysis center 14. Threat analysis center 14 uses the current list version to determine a set of information to send to mobile device 50 to bring the lists stored by mobile device 50 up to date with the most current compiled lists.

In accordance with the techniques of this disclosure, mobile device 50 uses the lists to determine whether an application possibly includes malware based on an analysis of the permissions of the application. Accordingly, mobile device 50 receives the lists (or updates thereto) from threat analysis center 14 (210). At some point, mobile device 50 receives and installs a new application, e.g., from application market 16 (212). Because the application is newly received, malware detection module 84 treats the application as a target application for analysis. That is, malware detection module 84 determines permissions associated with the application, as well as a type for the application.

When mobile device 50 retrieves the target application, the application includes a set of data (e.g., metadata) that describes, among other things, a type for the application and a set of permissions for the application. Malware detection module 84 analyzes the metadata to extract the type for the application and the set of permissions, to determine the permissions and the type for the application (212).

Malware detection module 84 then determines whether the target application includes malware based on the permissions and the type for the application. In some examples, malware detection module 84 determines whether any of the permissions for the target application are not included in a list of "normal" permissions for the type for the target application. For each of the permissions not included in the list of "normal" permissions, malware detection module 84 may further determine whether the permission should be categorized as "concerning," e.g., when the permission is included in a global list of concerning permissions or in a list of concerning permissions for the type for the target application. In some examples, any time there is a permission for the target application that is not included in the list of "normal" permissions, malware detection module 84 determines that the application may include malware, and thus, categorizes the application as suspect or notable or otherwise in a manner that indicates that the target application is not necessarily safe to execute.

In some examples, malware detection module 84 compares each of the permissions for the target application to a list of "concerning" permissions for the type for the target application. When at least one of the permissions for the target application is included in the list of "concerning" permissions, malware detection module 84 indicates that the target application may include malware. In some examples, malware detection module 84 assigns the application to a category based on the number of permissions that are considered "concerning" for the target application. Malware detection module 84 further performs an action to mitigate the malware, such as deleting the target application, quarantining the malware, or alerting a user via a graphical user interface that the application may include malware and requesting that the user either ignore the warning or delete or quarantine the application.

The techniques of FIG. 5 are generally described with respect to determining whether permissions of a newly installed application potentially includes malware based on permissions for the application. However, it should be understood that similar techniques may be applied to determine whether a previously installed application potentially includes malware. Permissions for applications may be stored with the application, e.g., as metadata. Alternatively, malware detection module 84 may retrieve the set of permissions for the previously installed application from application market 16. In any case, malware detection module 84 may analyze permissions for a previously installed application to determine whether the previously installed application potentially includes malware, using techniques similar to those described with respect to FIG. 5. Likewise, techniques similar to the methods of FIGS. 6 and 7, described below, may also be applied to determine whether a previously installed application potentially includes malware. Moreover, in some examples, the techniques of this disclosure may be applied to determine whether an application potentially includes malware without actually installing or downloading the application, by analyzing the set of permissions for the application prior to installation or retrieval of the application.

Figure 6:
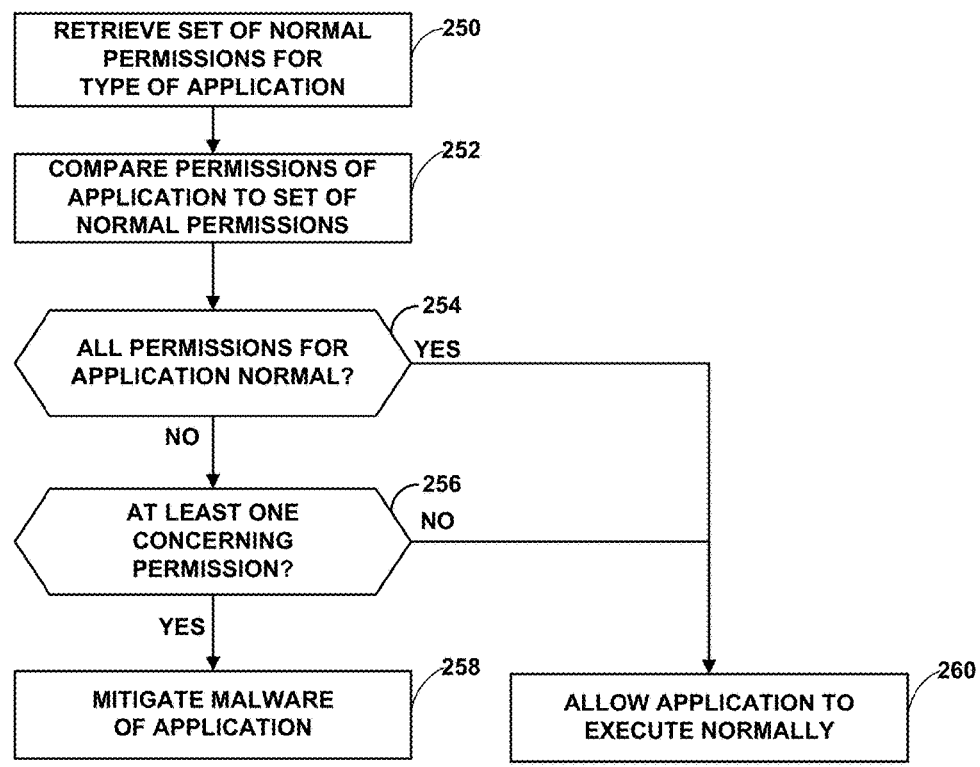
FIG. 6 is a flowchart illustrating an example method for determining whether an application includes malware based on permissions for the application.

FIG. 6 is a flowchart illustrating an example method for determining whether an application includes malware based on permissions for the application. In general, the method of FIG. 6 corresponds to step 216 of FIG. 5. In this example, malware detection module 84 has both a type for a target application and a set of permissions for the target application, as determined in step 214 of FIG. 5. Afterwards, malware detection module 84 retrieves a set of normal permissions for the type of application (250). For example, with respect to malware detection module 84 (FIGS. 2 and 3), permission lookup module 104 queries permissions lists 80 with the type for the application to retrieve the set of "normal" permission for the type of application.

Malware detection module 84 then compares each of the permissions for the target application to the set of "normal" permissions for the type of application (252). In one example, permissions categorizing module 110 (FIG. 3) iterates through each of the permissions of the target application and determines whether the current permission is included in the set of "normal" permissions. When the current permission is not included in the set of "normal" permissions, permissions categorizing module 110 adds the current permission to a subset of permissions for the target application that are to be further analyzed. After iterating through the set of permissions for the target application, the subset includes permissions for the target application that are not included in the set of "normal" permissions for the type for the target application.

Next, malware detection module 84 determines whether all permissions for the target application are considered "normal" (254). When all of the permissions for the target application are normal (e.g., when the subset is empty) ("YES" branch of 254), malware detection module 84 allows the application to execute normally (260). However, when there is at least one permission for the target application that is not normal (e.g., when the subset includes at least one element) ("NO" branch of 254), malware detection module 84 determines whether any or all of the permissions that are not normal are considered concerning (256). In some examples, any permission that is not normal is considered concerning, while in other examples, further analysis is performed to determine whether the permission is concerning, such as determining whether the permission is included in a list of globally concerning permissions or application-type-specific set of concerning permissions.

When there is not at least one concerning permission among the permissions that are not considered normal for the type of application ("NO" branch of 256), malware detection module 84 also allows the target application to execute normally (260). However, if there is at least one concerning permission for the application ("YES" branch of 256), malware detection module 84 mitigates malware of the application (258).

A determination that the application includes a concerning permission does not necessarily indicate that the application includes malware. Nevertheless, malware detection module 84 may perform a mitigating action with respect to an application suspected of including malware based on the analysis of permissions for the application. The mitigating action may include deleting the target application or quarantining the target application. Alternatively, alert generation module 126 may present a user interface indicating the name of the target application and that the target application is suspected of including malware, thus allowing a user to determine how to proceed. For example, the user may elect to proceed with executing the application as normal, or to delete the application.

In some examples, the mitigating action performed by malware detection module 84 corresponds to a category assigned to the target application, which may be based on a number of concerning permissions associated with the target application. For example, malware detection module 84 may present an alert requesting user feedback on how to proceed for a "suspicious" application, quarantine a "notable" application, and delete a "malware" application.

Figure 7:
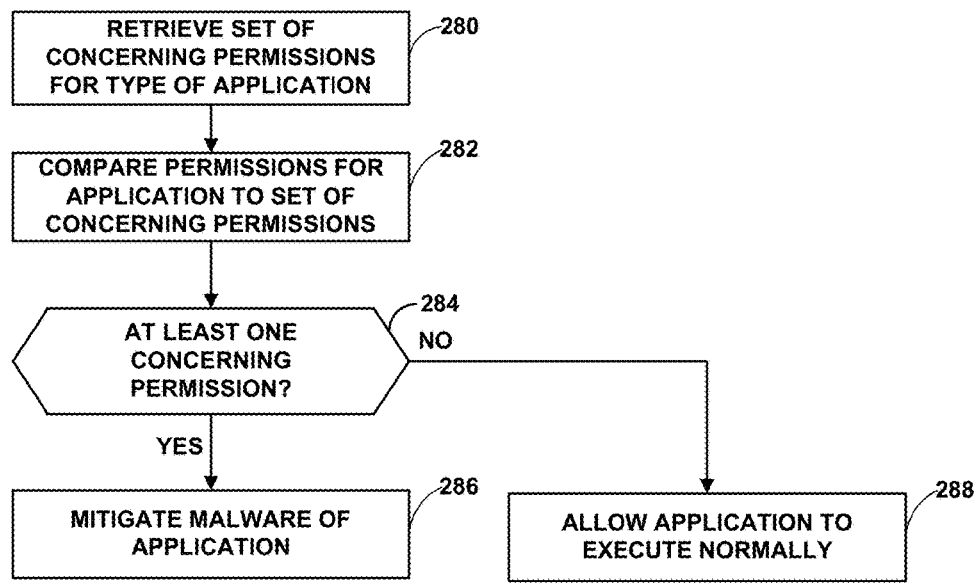
FIG. 7 is a flowchart illustrating another example method for determining whether an application includes malware based on permissions for the application.

FIG. 7 is a flowchart illustrating another example method for determining whether an application includes malware based on permissions for the application. In general, the method of FIG. 7 corresponds to step 216 of FIG. 5. In this example, malware detection module 84 has both a type for a target application and a set of permissions for the target application, as determined in step 214 of FIG. 5. Afterwards, malware detection module 84 retrieves a set of concerning permissions for the type of application (280). For example, with respect to malware detection module 84 (FIGS. 2 and 3), permission lookup module 104 queries permissions lists 80 with the type for the application to retrieve the set of "concerning" permission for the type of application.

Permissions categorizing module 110 then compares permissions for the application to the set of concerning permissions (282). That is, permission categorizing module 110 iterates through the permissions for the application and determines, for each of the permissions, whether the permission is included in the set of concerning permissions for the type of application. While performing this iteration, malware detection module 84 determines whether there is at least one concerning permission (284). When there is not at least one concerning permission among the permissions for the application ("NO" branch of 284), malware detection module 84 allows the target application to execute normally (288). However, if there is at least one concerning permission for the application ("YES" branch of 284), malware detection module 84 mitigates malware of the application (286). The mitigation actions that malware detection module 84 may perform are similar to those described with respect to step 258 of FIG. 6.

Figure 8:
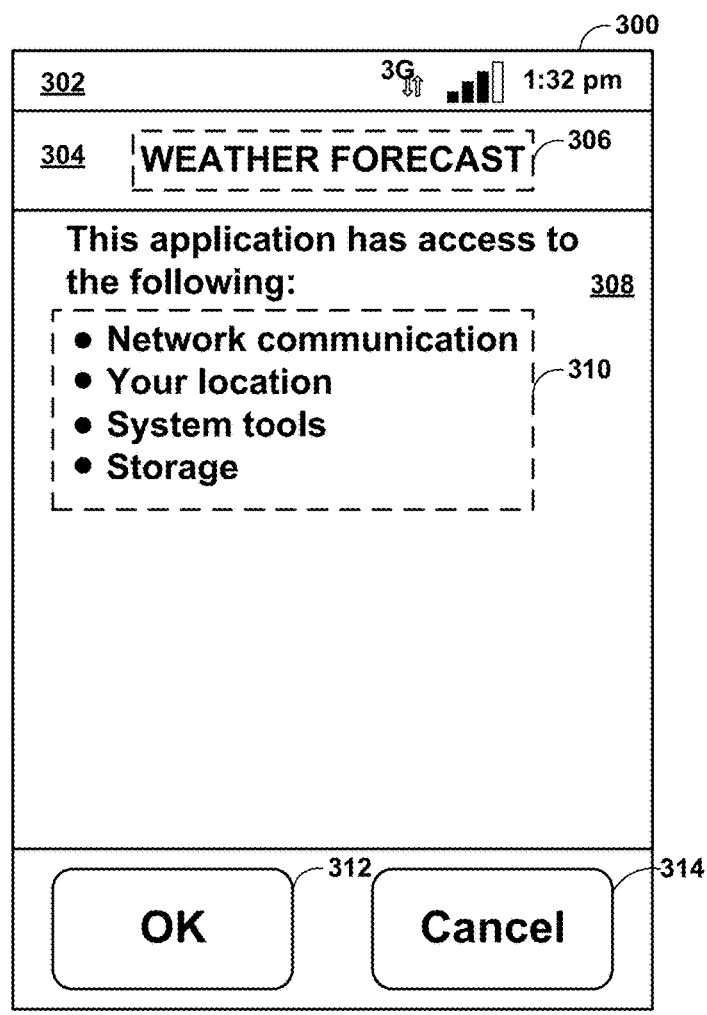
FIG. 8 is a conceptual diagram illustrating a user interface indicating permissions for a particular application.

FIG. 8 is a conceptual diagram illustrating a user interface 300 indicating permissions for a particular application. In this example, user interface 300 includes status indicator 302, application information 304, and permission information 308. Application information 304, in this example, provides a title 306 of an application, which is "WEATHER FORECAST" in this example. Permissions information 308 includes a set of permissions 310 describing elements of a mobile device to which the application will have access. In this example, the set of permissions 310 indicates that the application will have access to network communication, location data (which may be coarse or fine grain), system tools, and storage.

Set of permissions 310 represents an example of a set of permissions that can be used, in accordance with the techniques of this disclosure, to determine whether an application potentially includes malware. In particular, set of permissions 310 may be analyzed based on a type for the corresponding application. The type in this example corresponds to a weather application. Accordingly, set of permissions 310 may be analyzed based on lists of permissions associated with weather applications to determine whether the application potentially includes malware.

User interface 300 also provides OK button 312 and Cancel button 314. In general, user interface 300 is presented after a user has requested to download an application. Accordingly, after reviewing set of permissions 310 for the application, the user may select OK button 312 to proceed with downloading the application or Cancel button 314 to cancel downloading the application. After downloading the application, a malware detection application may analyze the permissions of the application to determine whether the application potentially includes malware. In some examples, the malware detection application may immediately analyze set of permissions 310 to determine whether the application potentially includes malware, and present an indication on user interface 300 of whether the application potentially includes malware. In this manner, the user may avoid downloading the application based on the indication.

Figure 9:
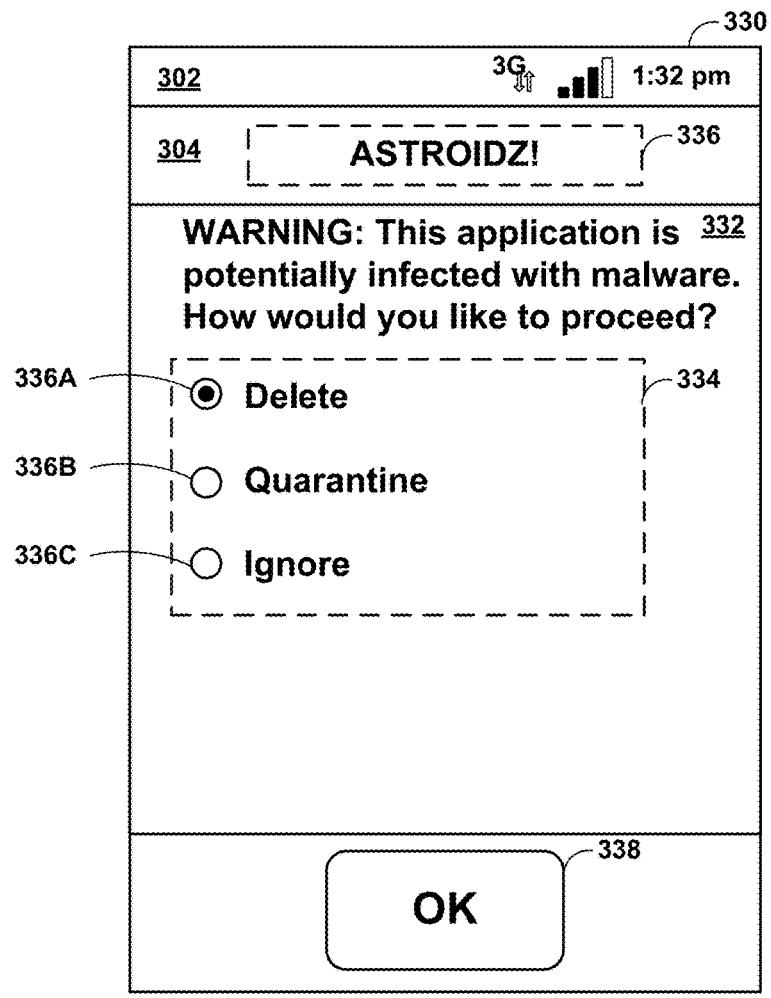
FIG. 9 is a conceptual diagram illustrating an example user interface that presents a user with options for handling an application determined to possibly include malware.

FIG. 9 is a conceptual diagram illustrating an example user interface 330 that presents a user with options for handling an application determined to possibly include malware. In this example, user interface 330 also includes status indicator 302 and application information 304. In FIG. 9, application information 304 includes title 336, which is "ASTROIDZ!" in this example. Moreover, in this example, it has been determined that this application possibly includes malware.

Accordingly, user interface 330 includes warning indicator 332 that provides a warning to the user that the application potentially includes malware. User interface 330 further includes user options 334, including "Delete," "Quarantine," and "Ignore." Each of the options is associated with a corresponding one of radio buttons 336A-336C (radio buttons 336). This allows the user to select an action to proceed. In this example, radio button 336A, associated with "Delete," is selected, as indicated by a dark circle within the lighter region of radio button 336A. After one of radio buttons 336 is selected, the user may select "OK" button 338 to proceed with the selected action. In this example, the ASTROIDZ! application will be deleted. In other examples, the application may be quarantined or the warning may be ignored by selecting the other respective radio buttons 336 and selecting OK button 338. While the example of FIG. 9 illustrates "quarantine" as an option, in some examples, user interface 330 presents only two options: delete and ignore. That is, a user may either elect to delete the application entirely, or proceed to install and execute the application normally and ignore the warning, without the option to quarantine the application.

Figure 10:
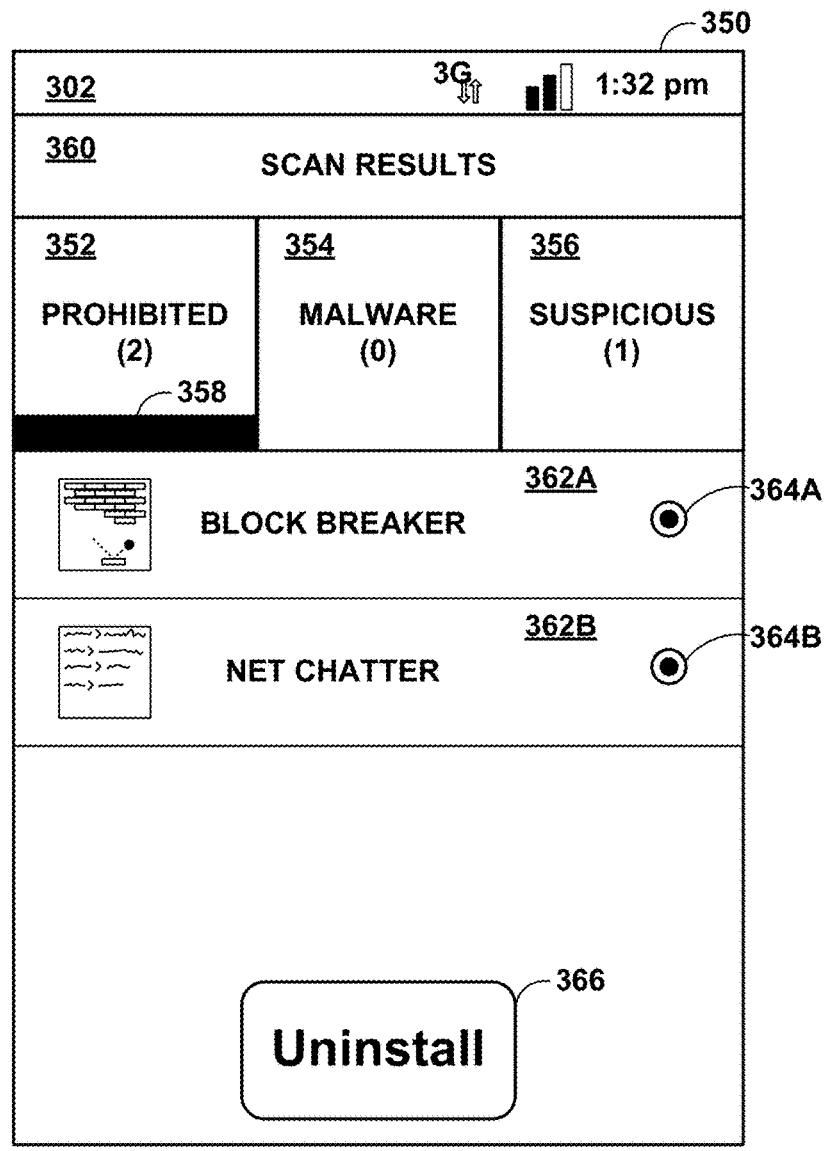
FIG. 10 is a conceptual diagram illustrating an example user interface that indicates to a user that certain applications are prohibited.

FIG. 10 is a conceptual diagram illustrating an example user interface 350 that indicates to a user that certain applications are prohibited. In this example, user interface 350 is generally presented after a security management module scans applications installed on the mobile device. Accordingly, user interface 350 presents scan results 360 that describes three categories of applications, in this example: prohibited applications, malware-infected applications, and suspicious applications. The user may view prohibited applications by selecting Prohibited button 352, malware-infected applications by selecting Malware button 354, and suspicious applications by selecting Suspicious button 356. Moreover, each of the buttons includes a number in parentheses indicative of the number of applications detected in each category. In this example, there are two prohibited applications, zero malware-infected applications, and one suspicious application.

In this example, user interface 350 displays a listing of prohibited applications detected on the mobile device. Selection indicator 358 is presented on Prohibited button 352 to indicate that prohibited applications are shown in greater detail. In this example, two applications are detected as prohibited: BLOCK BREAKER and NET CHATTER. In accordance with the techniques of this disclosure, these applications are detected based on their associated permissions. That is, the security management module uses permissions associated with the applications to determine that these applications are not permitted, that is, prohibited, e.g., in accordance with a corporate policy.

User interface 350 presents application information area 362A that includes a name and icon for the BLOCK BREAKER application, as well as radio button 364A, and application information area 362B that includes a name and icon for the NET CHATTER application and radio button 364B. In general, the security management module will prevent execution of these two applications, because they are prohibited. Accordingly, user interface 350 provides an option to the user to uninstall the applications. The user may select radio buttons 364 associated with applications the user wishes to uninstall (delete), and then select Uninstall button 366 to remove instructions associated with the applications. After Uninstall button 366 is selected, the mobile device will remove applications for which corresponding radio buttons 364 have been selected.

In some examples, user interface 350 presents one or more additional buttons that can be selected, in addition to prohibited button 352, malware button 354, and suspicious button 356. In some examples, user interface 350 presents a "virus" button that, when selected, causes user interface 350 to present an indication of applications including viruses. Although the term "malware" can refer to any malicious software (e.g., any application including malicious code or instructions, whether included by the original application developer or not), in some instances, "malware" is used to refer to applications that resemble other, non-malicious applications, that have been modified to become malicious. For example, a malicious user may retrieve instructions for a benign application, pirate the application, inject malicious code into the pirated application, and then present the pirated, malicious version of the application as if it were legitimate. On the other hand, a virus may infect an otherwise benign application, e.g., before, during, or after the application has been retrieved and/or installed. Accordingly, in some examples, the separate virus button may indicate that a particular virus was found that can be removed, whereas malware button 354 may indicate that a particular application is or includes malware. In some examples, viruses may be listed under the general category of "malware" when malware button 354 is selected.

Figure 11:
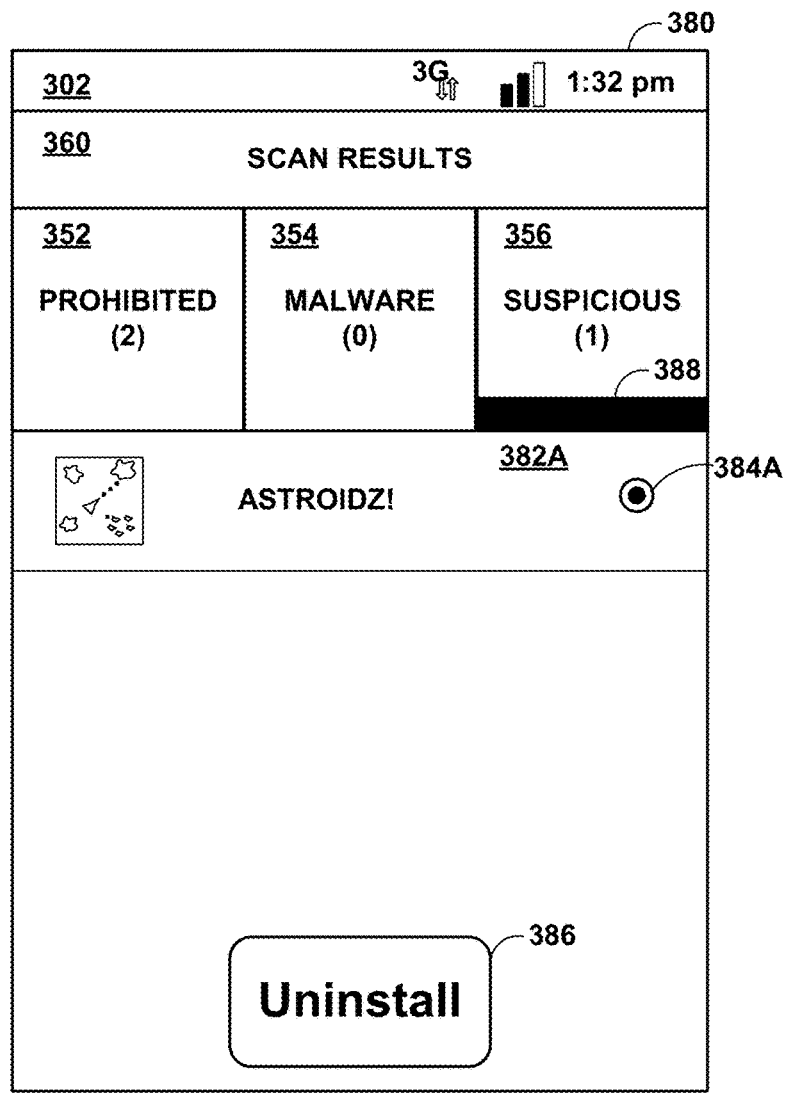
FIG. 11 is a conceptual diagram illustrating an example user interface that indicates to a user that certain applications are suspected of including malware.

FIG. 11 is a conceptual diagram illustrating an example user interface 380 that indicates to a user that certain applications are suspected of including malware. Prohibited button 352, Malware button 354, and Suspicious button 356 conform substantially to their counterparts in FIG. 10. Again, in some examples, additional buttons for other categories of applications (such as a "virus" button) may also be presented. In this case, selection indicator 388 is presented over Suspicious button 356, to indicate that Suspicious button 356 has been selected. Accordingly, user interface 380 presents a list of applications that are suspected of including malware. In accordance with the techniques of this disclosure, these applications are detected based on an analysis of the permissions of the applications.

As in FIG. 10, application information 382A presents information for a particular application (ASTROIDZ!, in this example), as well as radio button 384A. Application information 382A provides the name of the application and an icon for the application. The user may select radio button 384A to select the application to be removed, and then select Uninstall button 386 to remove the applications for which the corresponding radio buttons 384 were selected. After Uninstall button 386 is selected, the mobile device will remove applications for which corresponding radio buttons 384 were selected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A security method for enforcing policies of an enterprise network comprising:
   operating, by an enterprise administrator, an enterprise management console to manage a policy set of the enterprise network;
   operating, on a data processor of a mobile network device seeking to access services from the enterprise network, a detection module for analyzing a target application of the mobile network device, wherein operation of the detection module comprises:
   determining, by a permission management module, of the detection module, an application type of the target application;
   determining, by the permission management module, a set of application permissions of the target application; and,
   determining, by the permission management module, whether at least one of the set of application permissions of the target application is considered one of prohibited and concerning according to the policy set of the enterprise network; and,
   performing, by a threat management module, of the detection module, a mitigation action responsive to the permission management module determining that at least one application permission of the target application is one of permitted, concerning and not permitted according to the policy set of the enterprise network.

2. The method of claim 1 wherein the step of performing the mitigation action comprises generating an alert by an alert generating module operated by the threat management module.

3. The method of claim 2 wherein the step of generating the alert comprises transmitting the alert to the enterprise management console.

4. The method of claim 3 further comprising the step of, responsive to transmitting the alert to the enterprise management console, receiving from the enterprise management console, an indication, by the enterprise administrator whether one or more concerning application permissions is permitted.

5. The method of claim 2 wherein the mobile network device includes a display device and the step of generating the alert further comprises; displaying on the display device information to identify the target application, and information to identify one or more application permissions of the target application.

6. The method of claim 2 wherein the mobile network device includes a touch screen display device and the step of generating the alert further comprises;
   displaying on the touch screen display device a warning to indicate that a permission of the target application is one of concerning and not permitted; and,
   displaying on the touch screen a first selectable option button selectable to ignore the warning; and,
   displaying on the touch screen a second selectable option button selectable to take an action to one of delete and quarantine the target application.

7. The method of claim 1 wherein mobile network device includes a plurality of applications installed thereon further comprising the steps of:
   determining, by the permissions management module, an application type of each of the plurality of applications installed on the mobile network device;
   determining, by the permissions management module, a set of application permissions for each of the plurality of applications installed on the mobile network device;
   determining, by the permission management module, for each of the plurality of applications installed on the mobile network device, whether the set of application permissions for each of the plurality of applications includes at least one application permission is one of concerning and not permitted according to the policy set; and,
   performing by the threat management module, a mitigation action responsive to the permission management module determining that at least one application permission is one of concerning and not permitted according to the policy set.

8. The method of claim 7 wherein the step of performing the mitigation action comprises generating an alert by an alert generating module operated by the threat management module.

9. The method of claim 8 wherein the step of generating the alert comprises transmitting the alert to the enterprise management console.

10. The method of claim 9 further comprising the step of responsive to transmitting the alert to the enterprise management console, receiving, by the threat management module, from the enterprise console, by the enterprise administrator, an indication, whether one or more concerning application permissions is permitted.

11. The method of claim 8 wherein the mobile network device includes a display device and the step of generating the alert further comprises:
displaying, on the display device, an alert wherein the alert indicates that at least one of the plurality of applications installed on the mobile network device includes at least one application permission that is one of concerning and not permitted and further identifies each of the plurality of applications that includes at least one application permission that is one of concerning and not permitted.

12. The method of claim 8 wherein the mobile network device includes a touch screen display device and the step of generating the alert further comprises:
displaying on the touch screen display device a warning to indicate that a permission of at least one of the plurality of applications installed on the mobile network device is concerning;
displaying on the touch screen an identity of each of the plurality of applications that includes at least one of a concerning and a not permitted application permission; and,
displaying on the touch screen a selectable option button selectable to uninstall one or more of the plurality of applications that includes at least one not permitted application permission.

13. The method of claim 1 wherein the detection module for analyzing the target application is operable to analyze the target application without installing the target application onto the mobile network device.

14. The method of claim 1 wherein the target application is selected from an application market further comprising the steps of:
analyzing, by the detection module, the target application selected from the application market, prior to downloading the target application from the application market to the mobile network device.

15. The method of claim 1 wherein the target application is selected from an application market further comprising the steps of: analyzing, by the detection module, the target application selected from the application market after downloading the target application from the application market to the mobile network device and before installing the target application onto the processor of the mobile network device.

16. The method of claim 1 further comprising: operating a wireless network interface device in communication with the processor of the mobile network device wherein communication between the mobile network device and the enterprise network is at least in part over a radio access network.

17. The method of claim 1 further comprising: operating a wired network interface device in communication with the processor of the mobile network device wherein communication between the mobile network device and the enterprise network is at least in part over a network switch.

18. The method of claim 1 further comprising steps of; downloading the detection module from one of a threat analysis center and an application market that are separate from the enterprise network; and, installing the detection module onto the mobile network device prior to gaining access to the enterprise network.

19. The method of claim 18 further comprising receiving by the detection module from one of the threat analysis center and the application market, periodic updates to the permissions management module.

20. The method of claim 1 further comprising receiving by the detection module from any one of the threat analysis center, the application market, and the enterprise management console, periodic updates to the permissions management module.

21. A method comprising:
receiving, by a detection module, operating on a data processor of a network device, a list of expected application permissions for each of a plurality of different application types;
storing, on a memory module in communication with the data processor of the network device, the list of expected application permissions for each different application type;
determining, by a permission management module, of the detection module, an application type for each of one or more target applications of the network device;
extracting by the permissions management module, from each of the one or more target applications, a set of extracted application permissions;
comparing, by the permissions management module, the set of extracted application permissions with the list of expected application permissions for the application type that is matched with the application type of the target application;
determining, by the permissions management module, whether one or more of the extracted application permissions is not included in the expected application permissions for the application type that is matched with the application type of the target application; and,
if not, performing, by a threat management module of the detection module, a mitigation action responsive to the permission management module determining that one or more of the extracted application permissions is not included in the expected application permissions for the application type that is matched with the application type of the target application.

22. The method of claim 21 wherein the list of expected application permissions for each of a plurality of different application types is received from an application threat analysis center not associated with the enterprise network.

23. The method of claim 21 wherein the step of performing the mitigation action comprises generating an alert by an alert generating module operated by the threat management module.

24. The method of claim 23 further comprising:
operating, by an enterprise administrator, an enterprise management console to manage a policy set of the enterprise network;
wherein the step of generating the alert comprises transmitting the alert to the enterprise management console.

25. The method of claim 24 further comprising the step of, responsive to transmitting the alert to the enterprise management console, receiving, by the detection module, from the enterprise management console, an indication, by the enterprise administrator, whether any one of the one or more of the extracted application permissions that is not included in the expected application permissions for the application type is permissible according to the policy set.

26. The method of claim 21 wherein the detection module for analyzing the target application is operable to analyze the target application without installing the target application onto the network device.

27. The method of claim 21 wherein the target application is selected from an application market further comprising the steps of:
- analyzing, by the detection module, the target application selected from the application market, prior to downloading the target application from the application market to the mobile network device.

28. The method of claim 21 wherein the target application is selected from an application market further comprising the steps of:
- analyzing, by the detection module, the target application selected from the application market after downloading the target application from the application market to the network device and before installing the target application onto the processor of the network device.

29. The method of claim 1 further comprising:
- operating a wireless network interface device in communication with the data processor of the network device wherein communication between the network device and the enterprise network is at least in part over a radio access network.

30. The method of claim 1 further comprising:
- operating a wired network interface device in communication with the data processor of the network device wherein communication between the network device and the enterprise network is at least in part over a network switch.

* * * * *